United States Patent [19]

Ayano et al.

[11] 4,383,903
[45] May 17, 1983

[54] CURABLE RESIN COMPOSITION

[75] Inventors: Satoshi Ayano, Ninomiyamachi; Morio Gaku, Saitama; Nobuyuki Ikeguchi, Tokyo; Hidenori Kinbara, Tokyo; Yasunari Osaki, Tokyo, all of Japan

[73] Assignee: Mitsubishi Gas Chemical Company, Inc., Tokyo, Japan

[21] Appl. No.: 250,897

[22] Filed: Apr. 3, 1981

[30] Foreign Application Priority Data

Apr. 8, 1980 [JP] Japan ................................. 55-45882

[51] Int. Cl.$^3$ ................... C08G 73/00; C08G 73/112; G03C 1/70; G03C 1/68
[52] U.S. Cl. ..................... 204/159.16; 204/159.14; 204/159.15; 204/159.23; 430/196; 430/197; 430/285; 430/286; 430/919; 430/927; 528/86; 528/117; 528/119; 528/170; 528/172; 528/211; 528/248; 528/253; 528/322
[58] Field of Search ............... 430/197, 196, 285, 286, 430/927, 919; 204/159.14, 159.16, 159.23, 159.15; 528/170, 86, 119, 117, 211, 172, 322, 253, 248

[56] References Cited

U.S. PATENT DOCUMENTS

| | | | |
|---|---|---|---|
| 3,448,079 | 6/1969 | Grigat et al. | 260/59 |
| 3,553,244 | 1/1971 | Grigat et al. | 260/453 |
| 3,562,214 | 2/1971 | Kubens et al. | 260/47 |
| 3,721,566 | 3/1973 | Laridon et al. | 430/196 |
| 3,740,348 | 6/1973 | Grigat et al. | 260/453 AL |
| 3,755,402 | 8/1973 | Grigat et al. | 260/453 AR |
| 4,023,973 | 5/1977 | Imaizumi et al. | 430/927 |
| 4,092,172 | 5/1978 | Higuchi | 430/285 |
| 4,110,364 | 8/1978 | Gaku et al. | 528/170 |
| 4,192,685 | 3/1980 | Horike et al. | 430/285 |

FOREIGN PATENT DOCUMENTS

| | | |
|---|---|---|
| 51-63149 | 6/1976 | Japan . |
| 53-149300 | 6/1978 | Japan . |
| 1060933 | 5/1965 | United Kingdom . |
| 23175 | 6/1977 | United Kingdom . |

*Primary Examiner*—Charles L. Bowers, Jr.
*Attorney, Agent, or Firm*—Fleit, Jacobson & Cohn

[57] ABSTRACT

A photo-curable resin composition is disclosed comprising (i) a mixture and/or a preliminary reaction product of (a) at least one cyanate compound selected from the group consisting of polyfunctional cyanate esters, prepolymers of the cyanate esters, coprepolymers of the cyanate esters and an amine and mixtures thereof, (b) at least one compound selected from the group consisting of monomers having at least one olefinically double bond prepolymers of the monomers, liquid rubbers having one or more acryloyl or methacryloyl groups and mixtures thereof and optionally (c) at least one maleimide compound selected from the group consisting of polyfunctional maleimides, prepolymers of the maleimides, coprepolymers of the maleimides and an amine and mixtures thereof and (ii) a photo polymerization initiator or a photo sensitizer.

7 Claims, No Drawings

CURABLE RESIN COMPOSITION

BACKGROUND OF THE INVENTION

This invention relates to a photo-curable resin composition.

A variety of prior art photo-curable resin composition have been developed. However, when the prior art photo-curable resin compositions have been used in industries in which thermal resistance and solder resistance of cured resin are required, they do not always give satisfactory results.

SUMMARY OF THE INVENTION

The present inventors carried out research for obtaining a novel photo-curable resin composition by modifying a polyfunctional cyanate ester. As a result, it was found that a composition comprising (i) a mixture and/or a preliminary reaction product of a polyfunctional cyatate ester compound and a compound having at least one olefinically double bond in its molecular and (ii) a photo-polymerization initiator or a photo sensitizer is photo-curable. It was also found that the composition can be cured by combination of photo cure and thermal cure.

This invention relates to a photo-curable resin composition comprising (i) a mixture and/or a preliminary reaction product of (a) at least one cyanate compound selected from the group consisting of polyfunctional cyanate esters, prepolymers of the cyanate esters, co-prepolymers of the cyanate esters and an amine and mixtures thereof (sometimes hereinunder referred to as component (a)) and (b) at least one unsaturated compound selected from the group consisting of monomers having at least one olefinically double bond in its molecule, prepolymers of the monomers, liquid rubbers having one or more acryloyl or methacryloyl groups and mixtures thereof (sometimes hereinunder referred to as component (b)) and optionally at least one maleimide compound selected from the group consisting of polyfunctional maleimides, prepolymers of the maleimides or copolymers of the maleimides and amine (sometimes hereinunder referred to as component (c)) and (ii) a photo polymerization initiator or a photo sensitizer.

This invention also relates to a resin composition curable by actinic radiation and heat comprising a mixture and/or a preliminary reaction product of component (a) and component (b) and optionally component (c), (ii) a photo polymerization initiator or a photo sensitizer and (iii) a heat-curing catalyst or a curing agent.

DETAILED DESCRIPTION OF THE INVENTION

By polyfunctional cyanate ester employed as component (a) in the practice of this invention is meant a compound having at least two cyanate groups in its molecule. The polyfunctional cyanate ester is represented by the formula

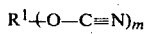

wherein $R^1$ is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

wherein $R^2$ and $R^3$ are the same or different and each represents a hydrogen atom or an alkyl group containing 1 to 4 carbon atoms,

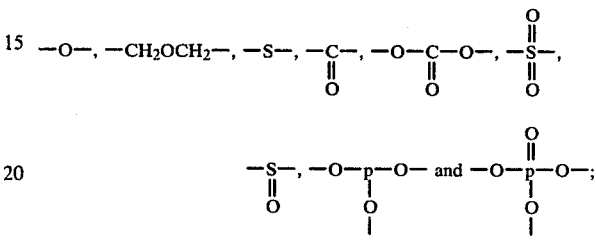

said aromatic nucleus is optionally substituted by a substituent selected from the group consisting of alkyl groups containing 1 to 4 carbon atoms, alkoxy groups containing 1 to 4 carbon atoms, chlorine and bromine; m is an integer of 2 to 5, and the cyanate group is always directly bonded to the aromatic nucleus.

Examples of the polyfunctional cyanate ester include dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-dibromo-4-cyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak derived from novolak; cyanated bisphenol type polycarbonate oligomer derived from bisphenol type polycarbonate oligomer and mixture thereof. Other cyanate esters employed in the practice of this invention are given in Japanese Patent Publication Nos. 1928/1966, 4791/1969, 11712/1970 and 41112/1971 and Japanese Patent Publication (laid open) No. 63149/1976 which are incorporated herein by references. The above-mentioned cyanate esters may be used as mixtures.

Prepolymers may be used containing a sym-triazine ring which is prepared by the trimerization of the cyanate groups of the cyanate ester, and which have an average molecular weight of at least 400 but no more than 6,000. Such prepolymers can be prepared by polymerizing the above cyanate esters in the presence of, as a catalyst, an acid such as a mineral acid or a Lewis acid, a base such as sodium hydroxide, a sodium alcoholate or a tertiary amine, or a salt such as sodium carbonate or lithium chloride.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention.

A coprepolymer of the cyanate ester and an amine may be used as the cyanate ester component. Examples of the amines include meta- or para-phenylenediamine, meta- or para-xylylenediamine, 1,4- or 1,3-cyclohexanediamine, hexahydroxylylenediamine, 4,4-diaminobiphenyl, bis(4-aminophenyl)methane, bis(4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl)cyclohexane, 2,2-bis(4-aminophenyl)propane, 2,2-bis(4-amino-3-methylphenyl)propane, 2,2-bis(3,5-dibromo-4-aminophenyl)propane, bis(4-aminophenyl)phenylmethane, 3,4-diaminophenyl-4'-aminophenylmethane and 1,1-bis(4-aminophenyl)-1-phenylethane.

A mixture of prepolymer of the cyanate ester and coprepolymer of the cyanate ester and an amine may be used as component (a) of this invention.

Compounds which can be employed as component (b) of this invention are monomers having at least one olefinically double bond, prepolymers of the monomers and liquid or elastic rubbers having one or more acrylol or methacrylol group component (b) is selected from the group consisting of the following: (i) compounds having at least one acryloyl or methacryloyl group represented by the formula

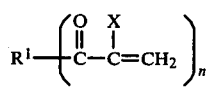

wherein $R^1$ is organic group comprising as member constituting a main chain or ring C and optionally O and/or N and optionally as a pendant hydroxy and/or halogen, when $R^1$ contains aromatic group, $R^1$ has 6–35 carbon atoms, and when $R^1$ contains no benzene ring, $R^1$ has 1–15 carbon atoms, X is hydrogen or methyl, n is integer of 1, 2, 3, 4, 5 or 6 and valency of $R^1$ is the same as n. In general, a cured resin obtained by employing an acrylic compound having a long chain has poor heat resistance. Therefore, when $R^1$ contains no benzene ring in the above formula, it is critical that $R^1$ has 1–15 carbon atoms, whereas when $R^1$ contains aromatic group in the above formula, it is critical that $R^1$ has 6–35 carbon atoms. Preferably, the compound having one or more acrylic ester groups is selected from the group consisting of (i) compounds represented by the formula

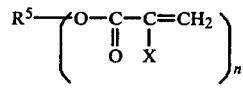

wherein $R^5$ is aliphatic hydrocarbon having 6–35 carbon atoms, or hydroxy or halogen-substituted hydrocarbon having 1–15 carbon atoms, X and n are defined above and valency of $R^5$ is the same as n;

(ii) compounds represented by the formula

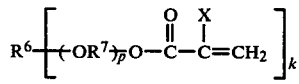

wherein $R^6$ is aliphatic hydrocarbon or hydroxy or halogen-substituted hydrocarbon, $R^7$ is alkylene or hydroxy or halogen-substituted alkylene, $R^6$, $R^7$, p and k are selected so that (the number of carbon atoms of $R^6$)+(the number of carbon atoms of $R^7$)×(p)×(k) is 15 or less, X is as defined above and valency of $R^6$ is the same as k, and k is 1, 2, 3, 4, 5 or 6.

(iii) compounds represented by the formula

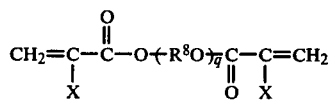

wherein $R^8$ is alkylene, or hydroxy or halogen-substituted alkylene, $R^8$ and q are selected so that (the number of carbon atoms of R)×(q) is 15 or less, X is as defined above:

(iv) compounds represented by the formula

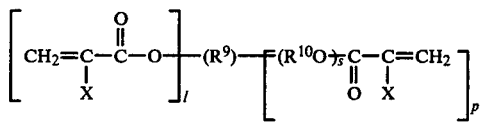

wherein $R^9$ is aliphatic hydrocarbon or hydroxy or halogen-substituted hydrocarbon, $R^{10}$ is alkylene or hydroxy or halogen-substituted alkylene, 1+p is 2, 3, 4, 5 or 6, (the number of carbon atoms of $R^9$)+(the number of carbon atoms of $R^{10}$)×(s)×(p) is 15 or less, X is as defined above, and valency of $R^6$ is the same as 1+p, and each of l and p is at least one, (v) compounds represented by the formula

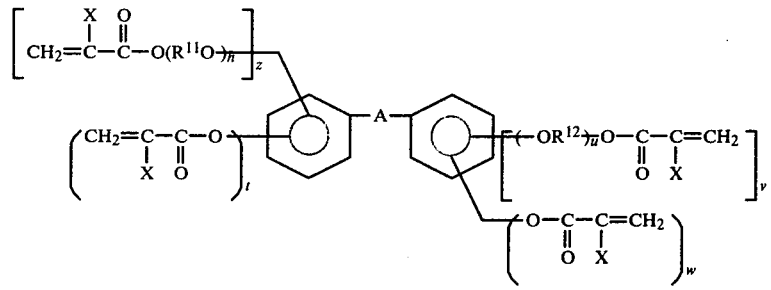

wherein $R^{11}$ and $R^{12}$ are the same or different, and independently alkylene having 2–3 carbon atoms, or hydroxy or halogen-substituted alkylene having 2–3 carbon atoms, A is —O—, —CH$_2$—, —C$_2$H$_5$—, or —C$_3$H$_7$—, t and w are independently 0 or 1, v and z are independently 1 or 2, and u and h are independently p or integer 1–7, and X is as defined above, (vi) compounds represented by the formula

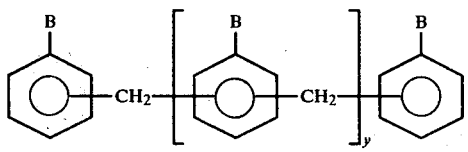

wherein y is 1, 2, or 3 and at least two of B groups on the benzene rings are

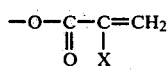

wherein X is as defined above and the remainder of B groups are hydroxy, (vii) compound represented by the formula

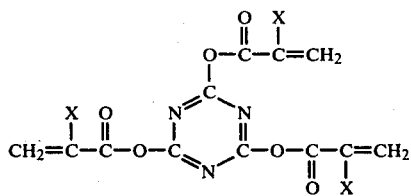

wherein X is as defined above, and (viii) compounds having at least one acrylamide group represented by the formula:

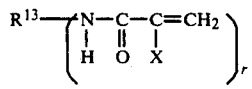

wherein R$^{13}$ is hydrogen or organic group comprising as member constituting a main chain or ring C and optionally O and/or N and as a pendant hydroxy and/or halogen, when R$^{13}$ contains aromatic group, R has 6–35 carbon atoms; and when R$^{13}$ contains no benzene ring, R$^{13}$ has 1–15 carbon atoms, X is hydrogen or methyl, r is integer of 1, 2, 3, 4, 5 or 6 and valency of R$^{13}$ is the same as r. In general, a cured resin obtained by employing an acrylic amide compound having a long chain has poor heat resistance. Therefore, when R$^{13}$ contains no benzene ring in the above formula, it is critical that R$^{13}$ have 1–15 carbon atoms, whereas when R$^{13}$ contains aromatic group in the above formula, it is critical that R$^{13}$ has 6–35 carbon atoms.

Typical Examples of the compounds having one or more acrylic or methacrylic ester groups include methyl methacrylate or acrylate, ethyl methacrylate or acrylate, butyl methacrylate or acrylate, 2-hydroxy methacrylate or acrylate, ethylene grycol dimethacrylate or diacrylates, diethylene glycol dimethacrylate or diacrylate, triethylene glycol dimethacrylate or diacrylate, polyethylene glycol dimethacrylate or diacrylate, 1,3-butylene glycol dimethacrylate or diacrylate, 1,4-butylene glycol dimethacrylate or diacrylate, neopentyl glycol dimethacrylate or acrylate, dipropylene glycol dimethacrylate or diacrylate, polypropylene glycol dimethacrylate or diacrylate, 2,2-bis(4-methacryloxydiethoxyphenyl)propane, 2,2-bis(4-acryloxydiethoxyphenyl)propane, propylene glycol diacrylate or dimethacrylate, 1,3-propanediol diacrylate or dimethacrylate, 1,4-butanediol diacrylate or dimethacrylate, 1,5-pentanediol diacrylate or dimethacrylate, 1,6-hexanediol diacrylate or dimethacrylate, 1,1,1-trimethylol propane triacrylate or trimethacrylate, 1,1,1-trimethylol ethane trimethacrylate or triacrylate, tetramethylol methane triacrylate or trimethacrylate, tetramethylol methane tetracrylate or tetramethacrylate, dibromoneopentyl glycol dimethacrylate or diacrylate, glycerin triacrylate or trimethacrylate, pentaerythritol diacrylate or dimethacrylate, pentaerythritol triacrylate or trimethacrylate, pentaerythritol tetracrylate or tetramethacrylate, sorbitol tetracrylate or tetramethacrylate, sorbitol hexacrylate or hexamethacrylate, sorbitol pentacrylate or pentamethacrylate, 1,4-hexanediol diacrylate or dimethacrylate, 2,2-bis(acryloyloxycyclohexyl)propane, 2,2-bis(methacryloyloxyclohexyl)propane, tetraethylene glycol diacrylate or dimethacrylate, 2,2-bis(4-acryloxyphenyl)propane, 2,2-bis(4-methacryloxyphenyl)propane, 2,2-bis[4-(2-acryloxy-ethoxy)phenyl]propane, 2,2-bis[4-(2-methacryloxy-ethoxy)phenyl]propane, 2,2-bis[4-(acryloxy-di(ethyleneoxy)phenyl)]propane, 2,2-bis[4-(methacryloxy-di(ethyleneoxy)phenyl)]propane, 2,2-bis[4-(acryloxy-poly(ethyleneoxy)phenyl)]propane, 2,2-bis[4-(methacyloxy-poly(ethyleneoxy)phenyl)]propane, polyvalent acrylate or methacrylate of phenol resin procondensate, epoxy polyacrylates or polymethacrylates obtained by reacting acrylic acid or methacrylic acid with bisphenol A type epoxy resin, novolak type epoxy resin, alicyclic epoxy resin, diglycidyl ester of phthalic acid, or reaction product of bisphenol A type epoxy resin and polycarboxylic acid, or acrylates or methacrylates obtained by reacting polyester having at least two hydroxy groups at its end with acrylic acid or methacrylic acid and mixtures thereof, polyurethane polyacrylates or polymethacrylate obtained by reacting polyurethane having two or more hydroxy group at its end or pendant position with acrylic acid or methacrylic acid, 2,2-dibromomethyl-1,3-propanediol diacrylate or dimethacrylate, and mixtures thereof, acrylamide, methacrylamide, N-methylol acrylamide, N-diacetone acrylamide, N,N'-methylene bisacrylamide, hexamethylene bisacrylamide, 1,3,3-trimethyl-1-acryloylaminomethyl-5-acryloylaminocyclohexane, hexahydro-1,3,5-triacryl-3-triazine, N,N'-bis(p-acryloylhydroethyl)aniline, N-ethoxymethylacrylamide, N-n-propoxymethylacrylamide, N-n-butoxymethylacrylamide, N-n-pentyloxymethylacrylamide, N-propoxyethylacrylamide, N-n-butoxyethylacrylamide and compounds having the formulas:

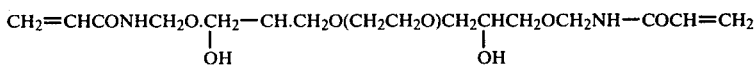

(II) liquid or elastic rubbers having one or more acryloyl or methacryloyl groups.

Typical examples of the liquid or elastic rubbers include polybutadiene, butadiene-acrylonitrile copolymer, polychloroprene, butadiene-styrene copolymer polyisoprene and natural rubbers into which one or more acryloyl or methacryloyl groups are introduced. Many processes for introducing methacryloyl or acryloyl group into the rubbers were known.

(III) compounds having at least one 1,2-vinyl or allyl group in its molecule represented by the formula

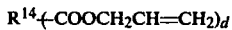

$$R^{14}+COOCH_2CH=CH_2)_d$$

wherein $R^{14}$ is organic group comprising as member constituting a main chain or ring C and optionally O and/or N and as a pendant hydroxy and/or halogen, when $R^{14}$ contains aromatic group, $R^{14}$ has 6–35 carbon atoms, and when $R^{14}$ contains no benzene ring, $R^{14}$ has 1–15 carbon atoms, d is integer of 1, 2, 3, 4, 5 or 6 and valency of $R^{14}$ is the same as d. In general, a cured resin obtained by employing an allyl ether compound having a long chain has poor heat resistance. Therefore, when $R^{14}$ contains no benzene ring in the above formula, it is critical that $R^{14}$ has 1–15 carbon atoms, whereas when $R^{14}$ contains aromatic group in the above formula, it is critical that $R^{14}$ has 6–35 carbon atoms. Examples of the compounds include diallyl phthalate diallyl isophthalate, diallyl maleate, diallyl chrorendate, diallyl adipate, diallyl glycolate, diethylene glycol bisallylcarbonate, and the like. (IV) compounds having at least one vinyl group represented by the formula

$$R^{15}+CH_2=CH_2)_e \text{ or } R^{16}+R^{17}-CH=CH_2)_e$$

wherein $R^{15}$ and $R^{16}$ are organic group comprising as member constituting a main chain or ring C and optionally O and/or N and as a pendant hydroxy and/or halogen, when $R^{15}$ and $R^{16}$ contain aromatic group, $R^{15}$ and $R^{16}$ have 6–35 carbon atoms, and when $R^{15}$ and $R^{16}$ contain no benzene ring, $R^{15}$ and $R^{16}$ have 1–15 carbon atoms, e is integer of 1, 2, 3, 4, 5 or 6 and valency of $R^{15}$ or $R^{16}$ are the same as e. In general, a cured resin obtained by employing a vinyl compound having a long chain has poor heat resistance. Therefore, when $R^{15}$ and $R^{16}$ contain no benzene ring in the above formula, it is critical that $R^{15}$ and $R^{16}$ have 1–15 carbon atoms, whereas when $R^{15}$ and $R^{16}$ contain aromatic group in the above formula, it is critical that $R^{15}$ and $R^{16}$ have 6–35 carbon atoms. $R^{17}$ represents —O—, —S—, —NH—, —CH_2—, and so on. Example of the compounds include styrene, divinyl benzene, acrylonitrile, vinyl acetal, N-vinyl pyrrolidone, triallyl isocyanulate and the like.

Prepolymers of the above compounds obtained by prepolymerizing the above compound having one or more olefinically double bond by means of an organic peroxide, ultraviolet or heat may be employed as component (b).

The ratio of component (a) and component (b) is not critical. Preferably the ratio by weight of component (a) to component (b) may be in the range of from 85:15 to 1:99, more preferably from 70:30 to 30:70. For example, when it is necessary for a cured resin to have heat resistance, more component (a) is used than component (b).

When component (c) is used with components (a) and (b), the heat resistance of the cured resin is further improved.

The polyfunctional maleimides employed in the present invention are organic compounds having two or more maleimide groups derived from maleic anhydride and a polyamine and are represented by the following general formula

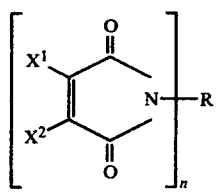

wherein R represents divalent to pentavalent aromatic or alicyclic organic group, each of $X^1$ and $X^2$ represents a hydrogen atom, halogen atom or alkyl group, and n represents integer of 2–5.

The maleimides represented by the above formula can be produced by a method known per se which involves reacting maleic anhydride with polyamine to form a maleamide acid, and then dehydro-cyclizing the maleamide acid. Examples of polyfunctional maleimide include consisting of 1,3- or 1,4-dimaleimide benzene, 1,3- or 1,4-bis(maleimido methylene)benzene, 1,3- or 1,4-dimaleimide cyclohexane, 1,3- or 1,4-bis(maleimidemethylene)cyclohexane 4,4'-dimaleimide biphenyl, bis(4-maleimidephenyl)methane, bis(4-maleimidephenyl)ether, bis(4-maleimidephenyl)sulfone, bis(4-maleimide-3-methylphenyl)methane, bis(4-maleimido-3-chlorophenyl)methane, bis(4-maleimido-3,5-dimethylphenyl)methane, 2,2-bis(4-maleimido-3-methylphenyl)propane, 2,2-bis(4-maleimido-3,5-dibromophenyl)propane, bis(4-maleimidephenyl)-phenylmethane, 3,4-dimaleimidephenyl-4'-maleimidephenylmethane, 1,1-bis(4-maleimidephenyl)-1-phenylmethane, and maleimides derived from melamine and addition product of formalin and an aniline in which benzene rings of two or more aniline bond through methylene group.

Aromatic amines are preferable as the starting polyamines. The reason is that the resulting object resin has excellent properties, such as heat-resistance, etc. When the resulting object resins have desirable flexibility and pliability, alicyclic amine alone or combination of the alicyclic amines and other amines may be used. Though secondary amines can be used as the starting amine, the primary amines are preferable.

Amines employed in reaction with cyanate esters for preparing coprepolymers of the cyanate ester and the amine may be profitably used as an amine component for preparing maleimides. In addition to the above-mentioned amines, melamine having s-triazine ring and polyamines obtained by reaction aniline with formaldehyde, in which two or more benzene rings are bonded through methylene bond, may also be used.

The functional maleimides as mentioned above may be used alone or as a mixture. Also the prepolymer of the maleimide obtained by heating the maleimide in the presence or absence of a catalyst may be used. In addition, coprepolymers of the maleimide and the amine employed for synthesizing the polyfunctional maleimide may be used.

The ratio of component (a) and component (c) is not critical. In general, the ratio by weight component (a) and component (c) may be in the range of from 99:1 to 40:60.

The resin component constituting the curable composition of this invention may be prepared by merely mixing the above-mentioned components (a) and (b) or components (a), (b) and (c) or by using the product or preliminary reaction of these components.

The resin component constituting the curable composition of this invention comprises a mixture and/or a preliminary reaction product of (a) at least one compound selected from the group consisting of polyfunctional cyanate esters, prepolymers of the cyanate esters or coprepolymers of the cyanate esters and an amine and (b) a compound having one or more olefinically double bond (c) at least one compound selected from the group consisting of polyfunctional maleimides, prepolymers of the maleimides and coprepolymers of the maleimides and an amine and/or (d) other component. The resin component may be a mixture of components (a) and (b) and optionally (c) and/or (d); a preliminary reaction product of components (a) and (b), components (a), (b) and (c) or components (a), (b), (c) and (d); a mixture of preliminary reaction product of two or three of components (a), (b), (c) and (d) and the remainder thereof. Other components (d) include epoxy resins, silicone resins, or alkyd resins having OH group or COOH group; polyester imide resins, polyamide imide resins, polyisocyanate resins, polyimide resin or polyhydantoin resins.

The photo polymerization initiators or the photo sensitizers employed as component (ii) of this invention include, for example azido compounds, such as azidobenzene, 4-azidobenzoic acid, 4-diazidobiphenyl, 1,2-bis(4-azidophenyl)ethylene, 4-aminophenyl-4'-azidophenylmethane, 4,4'-diazidobenzophenone, 2,6-di(4'-azidobenzal)cyclohexanone, sodium 4,4'-diazidostilben-2,2'-disulfonate and the like; carbonyl compounds, such as benzophenone, benzophenoneoxime, benzoin, benzoin methyl ether, benzoin ethyl ether, benzoin isopropyl ether, acetophenone, α-haloketone, ω-bromoacetophenone, cyclohexanone and the like; sulfur compounds, such as diphenylmonosulfide, dibenzothiazoly-disulfide, s-acyl-dithiocarbamate and the like; azo compounds, such as m,m'-azoxystyrene, azoisobutylnitrile and the like; organic peroxides, such as benzoyl peroxide, di-t-butyl peroxide and the like; inorganic ions, such $Fe^{3+}X_3^-$ wherein X is halogen, $Sb^{4+}Cl_4^-$ and the like; and benzophenoneoxime, stearic dialkyl, dithiocarbamate, t-butyl anthraquinone, 2-mercaptobenzothiazole, 7-diethylamino-4-methylcumarin, diphenyl iodonium and the like.

The amount of the photo polymerization initiator or the photo sensitizer employed may be in the range of 0.01–10 parts by weight per 100 parts of combined weight of resin components, preferably in the range of 0.2–5 parts by weight.

It is difficult to photo-cure only component (a). When a composition comprising component (a), component (b) and the photo polymerization initiator or the photo sensitizer is exposed to actinic radiation, such as ultraviolet, sunlight or the like, it is cured by cross-linkage. It is assumed in the curing reaction that active group of component (b) attacks cyanide group (—C≡N) of component (a).

When content of component (a) in the resin component of this invention is more than 60% by weight or when it is desirable to cure a composition comprising (i) a resin component and (ii) a photo polymerization initiator or a photo sensitizer by action of both actinic radiation and heat, a heat-curing catalyst or a curing agent may be incorporated into the composition.

Examples of the heat curing catalyst or the curing agent include imidazoles, such as 2-methylimidazole, 2-undecylimidazole, 2-heptadecyl imidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N-dimethyltoluidine, N,N-dimethyl-p-anisidine, p-halogeno-N,N-dimethylaniline, 2-N-ethylaniline ethanol, tri-n-butylamine, pyridine, quinoline, N-methylmorpholine, triethanolamine, triethylenediamine, N,N,N',N'-tetramethylbutanediamine, N-methylpiperidine; phenols, such as phenol, cresol, xylenol, resorcine, and phloroglucin; organic metal salts, such as lead naphthenate, lead stearate, zinc naphthenate, zinc octoate, tin oleate, dibutyl tin maleate, manganese naphthenate, cobalt naphthenate, and acetyl acetone iron; and inorganic metal salts, such as stannic chloride, zinc chloride and aluminum chloride; peroxides, such as benzoyl peroxide, lauroyl peroxide, octanoyl peroxide, acetyl peroxide, para-chlorobenzoyl peroxide and di-t-butyl diperphthalate; acid anhydrides, such as maleic anhydride, phthalic anhydride, lauric anhydride, pyromellitic anhydride, trimellitic anhydride, hexahydrophthalic anhydride, hexahydropyromellitic anhydride and hexahydrotrimellitic anhydride; azo compounds, such as azoisobutylonitrile, 2,2'-azobispropane, m,m'-azoxystyrene, hydrozones, and mixtures thereof.

In addition to the above-mentioned catalyst, a curing agent for epoxy resin and a curing catalyst for epoxy resin may be used as a catalyst of this invention. The amount of the catalyst employed may be in the range of 0.01–5% by weight, preferably 0.05–2.0% by weight of combined weight of resin components.

A variety of additives may be added to the curable composition to impact specific properties provided that they do not impair the essential properties of the resulting resin. Examples of the additives include natural or synthetic resins, fibrous reinforcement, fillers, pigments, dyestuffs, thickening agents, lubricants, flame-retardants and the like.

The curable compositions of this invention are present in a wide range of forms from liquid to solid at room temperature, depending on the natures of the components constituting the composition, and the preliminary reaction conditions. Solid curable composition, liquid curable composition or solution of the composition in solvent may be used according to the use purpose.

The UV curing conditions of the curable composition of this invention depend on proportion of components constituting the composition and the nature of the components employed. In case of post-curing by heating, the composition of this invention may be cured at a temperature within the range of 100°–250° C.

When the curable composition of this invention is used for preparing molding, laminate, adhesive-assembly, press means is preferably applied to the molding, laminate or adhesive-assembly in the heat curing step. In general, these products may be pressed at a super-pressure of 1–500 Kg/cm².

The composition of this invention is rapidly curable and is cured even under mild conditions, so is especially suitable when quantity production and ease of workability are desired. The cured resin made from the composition not only has excellent adhesive force, bond strength, heat resistance, and electric properties, but also is excellent in mechanical properties, such as impact resistance, chemical resistance, moisture resistance and the like. The composition of this invention has a variety of uses as a coating material for rust prevention, flame resistance, flame retardance and the like; as electrical insulating varnish; as adhesive; in laminates to be used for furnitures, building materials, sheathing materials, electrical insulating materials, and the like; and in a variety of moldings.

The present invention is further illustrated by the following non-limiting Examples and Controls. Percent and parts are by weight, unless otherwise specified.

EXAMPLES 1-5 CONTROL TESTS 1 AND 2

2,2-Bis(4-cyanatophenyl)propane (90 parts) and 2,2-bis(4-maleimidophenyl)methane (10 parts) were preliminarily polymerized at 145° C. for about 2 hours to obtain a preliminary reaction product (molecular weight of about 1000). The product is referred to as Resin A hereinunder.

Resin A, compound having methacryloyl group represented by the formula

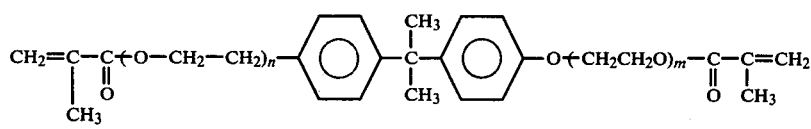

wherein m+n=2.6, benzoin isobutyl ether (BBI) zinc octoate (OcZn) and dimethylbenzylamine (DMBA) were blended in proportions as shown in Table 1. The resulting mixture was stirred. Glass cloth 70μ thick was impregnated with each of the resulting mixtures shown in Table 1 was cured by exposing the cloth to two high pressure mercury arc lamps (80 W/cm) from distance of 8 cm for 17 seconds. Each of the same mixtures shown in Table 1 was coated on G-10 Glass Epoxy Laminates in a thickness of 20μ and was cured in the same way as above.

The resulting glass sheets and glass epoxy laminates were heat-cured at 175° C. for 3 hours. The physical properties of the result products are shown in Table 2.

For comparison, the above procedures were repeated except that compound having methacryloyl group was not used. The proportions of the components and the physical properties of the resulting products are shown in Tables 1 and 2 as Control Tests 1 and 2.

TABLE 1

| | Example | | | | | Control test | |
|---|---|---|---|---|---|---|---|
| | 1 | 2 | 3 | 4 | 5 | 1 | 2 |
| Resin A | 85 | 70 | 50 | 30 | 70 | 100 | 100 |
| methacrylate compound | 15 | 30 | 50 | 70 | 30 | | |
| BBI | 5 | 5 | 5 | 5 | 5 | 5 | 5 |
| OcZn | | | | | 0.05 | | 0.05 |

TABLE 1-continued

| | Example | | | | | Control test | |
|---|---|---|---|---|---|---|---|
| | 1 | 2 | 3 | 4 | 5 | 1 | 2 |
| DMBA | | | | | 0.05 | | 0.05 |

EXAMPLE 6

2,2-Bis(4-cyanatophenyl)propane (70 parts) and acrylamide (30 parts) were preliminarily polymerized at 130° C. for about 1 hour to obtain a preliminary reaction product having a molecular weight of about 1000. Benzoyl isobutyl ether (5 parts), zinc octoate (0.05 parts) and dimethyl benzyl amine (0.05 parts) were added to the reaction product. The mixture was stirred. Glass cloth (70μ thick) was impregnated with the mixture, and cured to expose to two high pressure mercury arc lamps (80 W/cm) from distance of 4 cm for 17 seconds. The same mixture was coated on G-10 Glass Epoxy Laminate in a thickness of 20μ, and was cured in the same way as above. The resulting glass sheet and glass epoxy laminate were heat-cured at 175° for 3 hours. The properties of the resulting product are shown in Table 2.

EXAMPLE 7

Resin A (70 parts), diallyl phthalate (30 parts), benzoin isobutyl ether (5 parts), zinc octoate (0.05 parts) and dimethyl benzyl amine (0.05 parts) were blended with stirred. Glass cloth was impregnated with the mixture and photo-cured in the same conditions as in Example 6 except that the exposing time was 34 second. Then it was heat-cured under the same conditions as in Example 6. The properties of the resulting products are shown in Table 2.

EXAMPLE 8

The procedure of Example 7 was repeated except that styrene was used in place of diallyl phthalate. The properties of the resulting product are shown in Table 2.

EXAMPLE 9

Resin A (70 parts), liquid NBR (molecular weight of 3000), pendant of which are modified with acrylic acid and benzoin isobutyl ester were blended to obtain a uniform mixture. Glass cloth (70μ thick) was impregnated with the mixture, and cured to expose to two high pressure mercury arc lamps (80 W/cm) from distance of 8 cm for 17 seconds. The mixture was coated on G-10 Glass Epoxy Laminate in a thickness of 20μ, and was cured in the same way as above. The resulting glass sheet and glass epoxy laminate were heat-cured at 175° C. for 3 hours. The properties of the resulting product are shown in Table 2.

TABLE 2

| | | Example | | | | | | | | | control |
|---|---|---|---|---|---|---|---|---|---|---|---|
| | | 1 | 2 | 3 | 4 | 5 | 6 | 7 | 8 | 9 | test |
| UV cure | glass transition point (°C.) | 121 | 108 | 83 | 52 | 165 | — | — | — | 105 | — |
| | adhering[1] property | 100/100 | 100/100 | 100/100 | 100/100 | 100/100 | 100/100 | 100/100 | 100/100 | 100/100 | not cured |
| | pensil hardness[2] | H | H | F | HB | 2H | F | F | F | F | not cured |
| | solvent resistance[3] | | | no change | | | | slightly whitened | | no change | not cured |
| | surface resistance[4] ($\Omega$) | $2 \times 10^{12}$ | $1 \times 10^{12}$ | $7 \times 10^{11}$ | $5 \times 10^{11}$ | $8 \times 10^{12}$ | — | — | — | $9 \times 10^{11}$ | not cured |
| UV cure + heat cure | glass transition point (°C.) | 173 | 150 | 135 | 127 | 220 | — | — | — | 180 | not cured |
| | adhering property | 100/100 | 100/100 | 100/100 | 100/100 | 100/100 | 100/100 | 100/100 | 100/100 | 100/100 | not cured |
| | pensil hardness | 3H | 3H | 2H | H | 3H | 3H | 3H | 3H | 3H | not cured |
| | solvent resistance | | | | | no change | | | | | not cured |
| | surface resistance ($\Omega$) | $5 \times 10^{13}$ | $2 \times 10^{13}$ | $1 \times 10^{13}$ | $8 \times 10^{12}$ | $7 \times 10^{13}$ | $1 \times 10^{13}$ | $9 \times 10^{12}$ | $1 \times 10^{13}$ | $2 \times 10^{13}$ | not cured |

Note:
[1] in accordance with ASTM-D-2197
[2] in accordance with JIS 5400
[3] After the sample was immersed in methyl ethyl ketone for 30 seconds, appearance of the sample was observed.
[4] Comb type pattern was used in accordance with ASTM

EXAMPLE 10

1,4-Dicyanatobenzene (200 g), 2,2-bis(4-glycidoxyphenyl)propane (700 g), methacryloyl group-containing compounds (100 g) represented by the formula

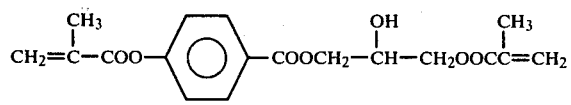

and diphenyliodonium (10 g) were blended so as to obtain a uniform mixture.

The resulting composition was coated on epoxy resin laminate. The laminate was placed on a belt conveyor moving at a speed of 7 m/min. The laminate was cured exposing to three ultra violet lamps (80 W/cm) from distance of 20 cm for 3 seconds (effective radiation time). The properties of the product are shown in Table 3.

TABLE 3

| dielectric strength | more than 600 V/25$\mu$ |
|---|---|
| hot solder resistance at 260° C. ± 5° C. float[5] | more than 20 seconds |
| pensil hardness | more than 3H |
| adhering property | 100/100 |

Note:
[5] when a 25 mm × 25 mm test sample is floated on melted solder of 260° C. ± 5° C. for a determined time, whether or not resin coating could be peeled from the laminate

EXAMPLE 11

2,2-Bis(4-cyanatophenyl)propane (1000 g) was preliminarily polymerized at 150° C. for 450 minutes. Glycidyl methacrylate (200 g) and t-butylanthraquinone (10 g) were added to the resulting prepolymer, and the mixture was stirred.

The mixture was coated on thin paper and was cured by ultraviolet and was cured by heat under the following conditions:

| amount of resin composition coated | 5–10 g/m$^2$ |
|---|---|
| ultraviolet | I.S.T. (80 W/cm) |
| speed at which sample moves | 10 m/min. |
| distance between lamp and sample | 4 cm |
| pass (times) | 10 |
| heat cure | 170° C. 60 minutes |

The properties of the coating are shown in Table 4.

TABLE 4

| | test method | result |
|---|---|---|
| appearance of coating | | good |
| flexural strength | 180 degree | success |
| solvent resistance | rubbing with methyl ethyl ketone (20 times) | no change |
| moisture and heat resistance | in accordance with JAS | success |
| heat resistance | 130° C. 1 hour | no change |
| staining properties | in accordance with JAS-B | success |

EXAMPLE 12

2,2-Bis(4-cyanatophenyl)ether (900 g) and bis(4-maleimidophenyl)ether (100 g) were preliminarily polymerized at 150° C. for 150 minutes. Compound (200 g) represented by the formula

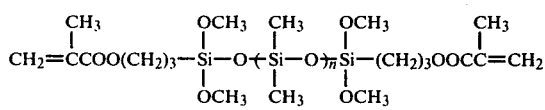

wherein n is average 10, methyl methacrylate (270 g), zinc octoate (0.3 g) and benzoyl peroxide (0.1 g) were added to the resulting preliminary reaction product, and the resulting was stirred.

Two 25 mm×10 mm sheets of glass 5 mm thick were adhered by using the mixture. The thickness of the adhering layer was 0.05 mm. The adhering layer was photo-cured by exposing the laminate to ultraviolet lamp (240 W) from distance of 10 cm for 60 minutes and was heat-cured 130° C. for 70 minutes. Adhesive strength under shear of the glass plate was 89 Kg/cm² at 50 mm/min. by autograph.

What is claimed is:

1. A photo-curable resin composition comprising:
   (i)(a) at least one cyanate ester compound selected from the group consisting of:
      (1) a polyfunctional aromatic cyanate ester monomer having the formula:

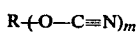
$$R\text{+}O\text{—}C\equiv N)_m$$

wherein m is 2 to 5 and R is an aromatic organic group, the cyanate groups being bonded to an aromatic ring of said aromatic organic group,
      (2) a homoprepolymer of one or more cyanate esters of (1), and
      (3) a coprepolymer of (1) and an amine;
   (b) at least one compound selected from the group consisting of:
      (1) a monomer having one to six olefinic double bonds selected from the group consisting of compounds represented by the formula:

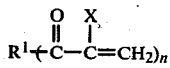
$$R^1\text{+}\underset{\underset{O}{\|}}{C}\text{—}\underset{\underset{X}{|}}{C}=CH_2)_n$$

wherein $R^1$ is an organic group comprising a main chain or carbon ring, or a main chain or carbon ring which contains O or N or a combination of O and N, or a main chain or carbon ring which is substituted by a pendant hydroxy or halogen or a combination of hydroxy and halogen, provided that when R contains an aromatic group $R^1$ has 6–35 carbon atoms, and when $R^1$ contains no benzene ring $R^1$ has 1–15 carbon atoms, X is hydrogen or methyl, n is an integer of 1, 2, 3, 4, 5 or 6 and the valency of $R^1$ is the same as n,
      (2) a homoprepolymer of one or more monomers of (1), and
      (3) a liquid rubber of (1) or (2) having one to six acryloyl or methacryloyl groups; and
   (c) at least one compound selected from the group consisting of:
      (1) a polyfunctional maleimide represented by the following general formula

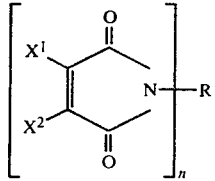

wherein R represents divalent to pentavalent aromatic or alicyclic organic group, each of $X^1$ and $X^2$ represents a hydrogen atom, halogen atom or alkyl group, and n represents an integer of 2–5,
      (2) a homoprepolymer of one or more maleimides of (1), and
      (3) a coprepolymer of (1) and an amine,
   said composition including a mixture of components (a), (b) and (c), a preliminary reaction product of components (a), (b) and (c), the combination of said mixture and said preliminary reaction product, the combination of (a) and the preliminary reaction product of (b) and (c), the combination of (b) and the preliminary reaction product of (a) and (c), or the combination of (c) and the preliminary reaction product of (a) and (b);
   (ii) a photo polymerization initiator or a photo sensitizer present in an amount of 0.01 to 10% by weight of combined weight of components (a), (b) and (c); and
   (iii) a heat curable catalyst or a curing agent.

2. The composition as defined in claim 1 wherein the cyanate ester is selected from the group consisting of 1,3-, 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane; 2,2-bis(3,5-dichloro-4-cyanatophenyl)propane; 2,2-bis(3,5-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak produced by reacting a novolak with cyanogen halide; cyanated bisphenolL polycarbonate oligomer produced by reacting a bisphenol polycarbonate oligomer with cyanogen halide; and mixtures thereof.

3. The composition as defined in claim 1 wherein the monomer is selected from the group consisting of compounds having one or more acryloyl or methacryloyl group represented by the following formulas (i), (ii), (iii), (iv), (v), (vi), (vii) and (viii)

$$R^5\text{+}O\text{—}\underset{\underset{O}{\|}}{C}\text{—}\underset{\underset{X}{|}}{C}=CH_2)_n \qquad (i)$$

wherein $R^5$ is aliphatic hydrocarbon having 6–35 carbon atoms, or hydroxy or halogen-substituted hydrocarbon having 1–15 carbon atoms, X and n are defined above and valency of $R^5$ is the same as n;

(ii) compounds represented by the formula

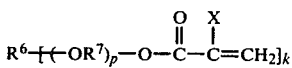
$$R^6\text{+}(\text{+}OR^7)_p\text{—}O\text{—}\underset{\underset{O}{\|}}{C}\text{—}\underset{\underset{X}{|}}{C}=CH_2]_k$$

wherein $R^6$ is aliphatic hdyrocarbon or hydroxy or halogen-substituted hydrocarbon, $R^7$ is alkylene or hydroxy or halogen-substituted alkylene, $R^6$, $R^7$, p and k are selected so that (the number of carbon atoms of $R^6$)+(the number of carbon atoms of $R^7$)×(p)×(k) is 15 or less, X is as defined above and valency of $R^6$ is the same as k, and k is 1, 2, 3, 4, 5 or 6.

(iii) compounds represented by the formula

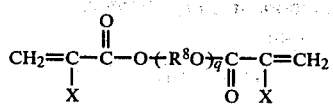

wherein $R^8$ is alkylene, or hydroxy or halogen-substituted alkylene, $R^8$ and q are selected so that (the number of carbon atoms of $R^8) \times (q)$ is 15 or less, X is as defined above: (iv) compounds represented by the formula

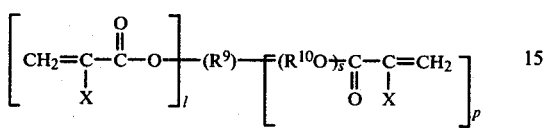

wherein $R^9$ is aliphatic hydrocarbon or hydroxy or halogen-substituted hydrocarbon, $R^{10}$ is alkylene or hydroxy or halogen-substituted alkylene, $l+p$ is 2, 3, 4, 5 or 6, (the number of carbon atoms of $R^9$)+(the number of carbon atoms of $R^{10}) \times (s) \times (p)$ is 15 or less, X is as defined above, and valency of $R^9$ is the same as $1+p$, and each of $l$ and p is at least one, (v) compounds represented by the formula

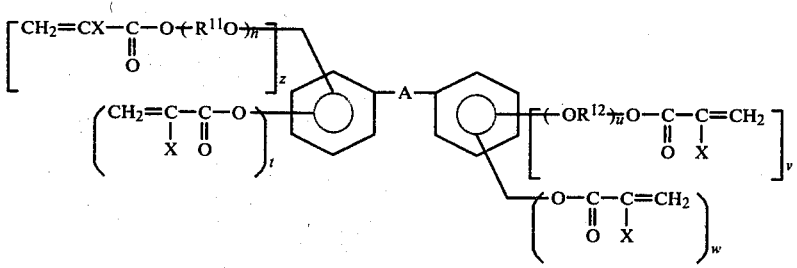

wherein $R^{11}$ and $R^{12}$ are the same or different, and independently alkylene having 2-3 carbon atoms, or hydroxy or halogen-substituted alkylene having 2-3 carbon atoms, A is —O—, —CH$_2$—, —C$_2$H$_5$—, or —C$_3$H$_7$—, t and w are independently 0 or 1, v and z are independently 1 or 2, and u and h are independently 0 or integer 1-7, and X is as defined above, (vi) compounds represented by the formula

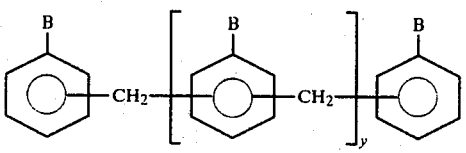

wherein y is 1, 2, or 3 and at least two of B groups on the benzene rings are

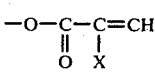

wherein X is as defined above and the remainder of B groups are hydroxy and (vii) compounds represented by the formula

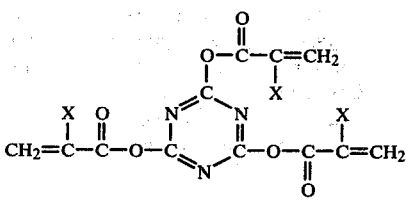

wherein X is as defined above,
(viii) compounds represented by the formula

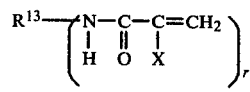

wherein $R^{13}$ is hydrogen or organic group comprising as member constituting a main chain or ring C and optionally O and/or N and optionally as a pendant hydroxy and/or halogen, when $R^{13}$ contains aromatic group $R^{13}$ has 6-35 carbon atoms; and when $R^{13}$ contains no benzene ring, $R^{13}$ has 1-15 carbon atoms, X is hydrogen or methyl, r is integer of 1, 2, 3, 4, 5 or 6 and valency of $R^{13}$ is the same as r, and liquid rubbers having one or more acryloyl or methacryloyl groups.

4. The composition as defined in claim 1 wherein the polyfunctional maleimide is selected from the group consisting of 1,3- or 1,4-dimaleimide benzene, 1,3- or 1,4-bis(maleimide methylene)benzene, 1,3- or 1,4-dimaleimide cyclohexane, 1,3- or 1,4-bis(maleimide methylene)cyclohexane, 4,4'-dimaleimide biphenyl, bis(4-maleimidephenyl)methane, bis(4-maleimidephenyl)ether, bis(4-maleimidephenyl sulfone, bis(4-maleimide-3-methylphenyl)methane, bis(4-maleimide-3-chlorophenyl)methane, bis(4-maleimide-3,5-dimethylphenyl)methane, 2,2-bis(4-maleimide-3-methylphenyl)propane, 2,2-bis(4-maleimide-3,5-dibromophenyl)propane, bis(4-maleimidephenyl)phenylmethane, 3,4-dimaleimidephenyl-4'-maleimidephenylmethane, 1,1-bis(4-maleimidephenyl)-1-phenylmethane, and maleimide derived from melamine and, addition product of formalin and an aniline in which benzene rings of two or more aniline bond through methylene group.

5. The composition as defined in claim 1 wherein the photo polymerization initiator or the photo sensitizer is selected from the group consisting of azidobenzene, 4-azidobenzoic acid, 4-diazidobiphenyl, 1,2-bis(4-azidophenyl)ethylene, 4-aminophenyl-4'-azidophenylmethane, 4,4'-diazidobenzophenone, 2,6-di(4'-azidobenzal)cyclohexanone, sodium 4,4'-diazidostilben-2,2'-disulfonate, benzophenone, benzophenoneoxime, benzoin, benzoin methyl ether, benzoin ethyl ether, benzoin isopropyl ether, acetophenone, α-haloketone, ω- bromoacetophenone, cyclohexanone, diphenylmonosulfide, dibenzothiazoyldisulfide, s-acyl-dithiocarbamate, m,m'-azoxystyrene, azoisobutylnitrile, benzoyl peroxide, di-t-butyl peroxide $Fe^{3+}X_3{}^-$ wherein X is halogen, $Sb^{4+}Cl_4{}^-$, benzophenoneoxime, stearic dialkyl, dithiocarbamate, t-butyl anthraquinone, 2-mercaptobenzothiazole, 7-diethylamino-4-methylcumarin and diphenyl iodonium.

6. The composition as defined in claim 1 wherein the proportion of component (a) to component (b) is in the range of 85:15 to 1:99.

7. The composition as defined in claim 1 wherein the heat curing catalyst or the curing agent is used in an amount 0.01 to 5% by weight of combined weight of components (a), (b) and (c).

* * * * *